(12) United States Patent
Cvjeticanin

(10) Patent No.: US 8,342,800 B2
(45) Date of Patent: Jan. 1, 2013

(54) PLASTIC COMPRESSOR HOUSING AND METHOD FOR PRODUCING SAME

(75) Inventor: Nenad Cvjeticanin, Frankfurt (DE)

(73) Assignee: WOCO Industrietechnik GmbH, Bad Soden-Salmuenster (DE)

( * ) Notice: Subject to any disclaimer, the term of this patent is extended or adjusted under 35 U.S.C. 154(b) by 1162 days.

(21) Appl. No.: 12/038,779

(22) Filed: Feb. 27, 2008

(65) Prior Publication Data

US 2009/0053051 A1 Feb. 26, 2009

(30) Foreign Application Priority Data

Feb. 27, 2007 (DE) .......................... 10 2007 009 781

(51) Int. Cl.
*F04D 29/42* (2006.01)

(52) U.S. Cl. ...................... 415/200; 415/215.1; 415/206

(58) Field of Classification Search .................. 415/915, 415/200, 212.1, 215.1, 224, 232, 204, 206, 415/207

See application file for complete search history.

(56) References Cited

U.S. PATENT DOCUMENTS

| | | | |
|---|---|---|---|
| 1,467,254 | A | 9/1923 | Tarbet |
| 3,429,605 | A | 2/1969 | Soesbergen |
| 4,867,641 | A | 9/1989 | Okuno |
| 5,209,461 | A | 5/1993 | Whightsil, Sr. |
| 5,219,461 | A | 6/1993 | Hyll |
| 5,257,904 | A | 11/1993 | Sullivan |
| 5,711,652 | A | 1/1998 | van de Venne |
| 5,989,664 | A | 11/1999 | Takayama |
| 6,193,463 | B1 | 2/2001 | Adeff |
| 6,318,085 | B1 | 11/2001 | Torno |
| 6,428,288 | B1 | 8/2002 | King |
| 6,652,222 | B1 | 11/2003 | Wojtyczka |
| 6,823,624 | B2 * | 11/2004 | Proserpio ........................ 47/65.5 |
| 7,086,833 | B2 * | 8/2006 | Cvjeticanin et al. ....... 415/215.1 |
| 7,478,532 | B2 | 1/2009 | Martin |

(Continued)

FOREIGN PATENT DOCUMENTS

DE 2706110 A1 8/1978

(Continued)

OTHER PUBLICATIONS

European Search Report dated Dec. 6, 2007, in European Application No. EP 07 00 4322, filed Mar. 2, 2007, corresponding to U.S. Publication No. 2007/0199727, published Aug. 30, 2007, 2 pages.

(Continued)

*Primary Examiner* — Ninh H Nguyen
*Assistant Examiner* — Adam W Brown
(74) *Attorney, Agent, or Firm* — Christensen O'Connor Johnson Kindness PLLC

(57) ABSTRACT

A plastic compressor housing, in particular a radial flow compressor housing, preferably for a turbocharger, has at least one thermosetting plastic body for providing an intake pipe, a compressor duct, and an outlet pipe, and a thermoplastic at least partially covering the thermosetting plastic body in a hood-like fashion. The thermosetting plastic body is formed as a basic body and the thermoplastic is injection molded on the basic body. At least a first anchoring element is embodied on at least a first surface of the thermosetting plastic body and at least a second surface of the first anchoring element is substantially completely covered with the thermoplastic. The disclosure further relates to a method for producing a plastic compressor housing.

24 Claims, 5 Drawing Sheets

U.S. PATENT DOCUMENTS

| | | | |
|---|---|---|---|
| 2004/0018102 A1* | 1/2004 | Wand et al. | 417/407 |
| 2004/0145095 A1* | 7/2004 | McCollum et al. | 264/544 |
| 2004/0223847 A1 | 11/2004 | Cvjeticanin | |
| 2006/0185363 A1 | 8/2006 | Gustafson | |
| 2006/0201135 A1 | 9/2006 | Xie | |
| 2007/0020084 A1 | 1/2007 | Krines | |
| 2007/0081887 A1 | 4/2007 | Xie | |
| 2007/0199727 A1 | 8/2007 | Cvjeticanin | |
| 2008/0304960 A1 | 12/2008 | Cvjeticanin | |
| 2009/0202379 A1 | 8/2009 | Werner | |

FOREIGN PATENT DOCUMENTS

| | | | |
|---|---|---|---|
| DE | 34 24 661 A1 | 1/1986 | |
| DE | 91 01 683 U1 | 6/1992 | |
| DE | 44 38 750 A1 | 5/1996 | |
| DE | 197 20 286 A1 | 11/1998 | |
| DE | 197 50 516 A1 | 5/1999 | |
| DE | 100 54 855 A1 | 5/2002 | |
| DE | 101 03 669 A1 | 8/2002 | |
| DE | 10112764 A1 | 9/2002 | |
| DE | 102 60 042 A1 | 7/2004 | |
| DE | 10314209 B3 | 12/2004 | |
| DE | 10 2004 041 439 A1 | 3/2006 | |
| DE | 20 2004 019 366 U1 | 5/2006 | |
| DE | 10 2005 055 200 A1 | 5/2007 | |
| DE | 102006010461 B3 | 10/2007 | |
| DE | 10 2006 009 054 B4 | 11/2007 | |
| DE | 10 2007 027 282 B3 | 11/2008 | |
| DE | 10 2007 054 899 A1 | 5/2009 | |
| DE | 10 2008 008 981 A1 | 8/2009 | |
| EP | 0 166 940 B1 | 1/1986 | |
| EP | 0 499 191 A1 | 8/1992 | |
| EP | 1 188 544 A2 | 3/2002 | |
| EP | 1 674 671 A2 | 6/2006 | |
| EP | 1 830 071 B1 | 9/2007 | |
| EP | 2 003 343 A2 | 12/2008 | |
| GB | 2 281 941 A | 3/1995 | |
| JP | 55-118844 A | 9/1980 | |
| JP | 55-118845 A | 9/1980 | |
| JP | 58-056821 A | 4/1983 | |
| JP | 2000-205192 A | 7/2000 | |
| WO | 97/10439 A1 | 3/1997 | |
| WO | 98/44249 A1 | 10/1998 | |
| WO | 99/64747 A1 | 12/1999 | |

OTHER PUBLICATIONS

European Search Report dated Apr. 22, 2009, in European Application No. EP 08 01 0316, filed Jun. 6, 2008, corresponding to U.S. Publication No. 2008/0304960, published Dec. 11, 2008, 2 pages.

Hunold, D., et al., "Ingeniously Combined—Profitably Manufactured: Multi-Component Injection Moulding of Thermoplastics and Thermosets," Injection Moulding 91(3):39-41, Mar. 2001.

Office Action mailed Jul. 25, 2011, in U.S. Appl. No. 12/137,500, filed Jun. 11, 2008, 31 pages.

* cited by examiner

PLASTIC COMPRESSOR HOUSING AND METHOD FOR PRODUCING SAME

FIELD OF DISCLOSURE

The present disclosure relates to a plastic compressor housing, in particular a radial flow compressor housing, and furthermore relates to a method for the production thereof.

BACKGROUND

Various plastic compressor housings are known from the prior art. For example, DE 103 14 209 B3 describes a housing for a radial flow compressor that is produced from two housing parts made of a thermosetting plastic, in particular injection-molded. However, a thermosetting plastic housing has the disadvantage that it can be easily destroyed, in particular when employed in a turbocharger housing, if a fan impeller splinters in the turbocharger housing. Not only does this involve the risk of damage to a motor vehicle in which the turbocharger is installed, but also creates a risk of injury to people.

Furthermore, DE 101 12 764 discloses a radial flow compressor housing that comprises thermoplastic. However, it has been demonstrated that a thermoplastic housing is not suitable for use as a turbocharger housing due to inadequate stability.

Furthermore known from the prior art are plastic compressor housings that include at least two components. Thus, DE 27 06 110 A1 discloses a compressor housing for exhaust turbochargers. The compressor housing comprises a light metal, ferritic materials, or plastic, at least a portion of one wall of the compressor housing being provided with a cast reinforcement or a reinforcement placed thereover. However, it is a disadvantage in this compressor housing that it is not possible to create it from a thermosetting plastic component and a thermoplastic component, which is preferable in particular for reasons of weight. Thus a thermosetting plastic body must be tempered at high temperature, which prohibits processing together with a thermoplastic reinforcement. On the other hand, sliding a thermoplastic reinforcement over a thermosetting plastic body does not lead to a sustainable bond between the two components.

Furthermore, DE 10 2006 010 461.7-15, commonly owned by the assignee of the present application, suggests a plastic compressor housing in which a thermosetting plastic body is at least partially covered in a hood-like fashion by a thermoplastic body. Although this compressor housing has basically proved itself, it has been demonstrated that the structural strength of the plastic compressor housing in the most extreme load situations can be further improved.

SUMMARY

Disclosed herein are various embodiments of a plastic compressor housing that has improved structural strength, in particular prevents separation of the thermoplastic from the basic thermosetting plastic body, even in extreme load conditions, enhances the secure fastening of the plastic compressor housing to a bearing structure, provides an improved bond between the plastic compressor housing and a fluid guide device, and/or has improved loadability in terms of tensile and/or bending forces. Furthermore, a production method is provided for overcoming the disadvantages known from the prior art.

More specifically, in at least one embodiment disclosed herein, a plastic compressor housing, in particular a radial flow compressor housing that is preferably designed for a turbocharger, has at least one thermosetting plastic body for providing an intake pipe, a compressor duct, and an outlet pipe. A thermoplastic at least partially covers the thermosetting plastic body in a hood-like fashion, the thermosetting plastic body being formed as the basic body, and the thermoplastic being injection molded on the basic body.

In an embodiment disclosed herein, a first surface of at least a first anchoring element is embodied on at least a first surface of the thermosetting plastic body, and at least a second surface of the first anchoring element is contacted with the thermoplastic, wherein the thermoplastic substantially covers the anchoring element.

In another embodiment disclosed herein, at least one end edge of the thermosetting plastic body is covered, at least in regions, by the thermoplastic, in particular is coated with the thermoplastic. In a further embodiment, the thermosetting plastic body tapers toward the free end in the area of the end edge, preferably of the intake pipe and/or outlet pipe, preferably saving material on at least one interior wall, and an extension of the thermoplastic wraps around the end edge.

In both of the aforesaid embodiments, the thermosetting plastic body may be covered substantially completely by the thermoplastic at least in the area of the intake pipe and/or the compressor duct.

In another embodiment, the plastic compressor housing comprises at least one fluid guide element that can be connected to the intake pipe, compressor duct, and/or outlet pipe, wherein the fluid guide element may be covered, at least in regions, by the thermoplastic, and wherein at least one second anchoring element is embodied preferably on at least one surface of the fluid guide element that is covered, at least in regions, by the thermoplastic. In the latter embodiment, the fluid guide element comprises at least one fluid filter element, at least one guide element such as a fluid pipe, and/or at least one damping element such as a charge air damper. In a further embodiment, at least one anchoring element is embodied on at least a surface of the intake pipe, compressor duct, and/or outlet pipe that is covered, at least in regions, by said thermoplastic.

In the above embodiments, the fluid guide element may comprise, at least in regions, a plastic and/or a metal.

In additional embodiments, the thermosetting plastic body has at least one attachment area having an adapted step-like, contour form. The attachment area is useful for attaching, or receiving, at least in regions, at least one additional compressor housing element. The additional compressor housing element may include a compressor housing rear wall that preferably includes a metal, at least in regions forming at least one surface of the attachment area and/or at least one surface adjacent to the attachment area forming the first surface of the thermosetting plastic body.

In the latter embodiment, an extension of the thermoplastic may extend beyond the attachment area of the thermosetting plastic, preferably beyond the step-like contour form of the thermosetting plastic, in particular for providing at least one sealing lip, wherein it is possible to snap in the compressor housing element in particular between the attachment area of the thermosetting plastic and the extension of the thermoplastic.

Furthermore, the plastic compressor housing may comprise a first fastening means embodied in the thermosetting plastic body, wherein at least one fastening element can be brought into reciprocal action with the first fastening means, in particular can be connected to the first fastening means. The plastic compressor housing may also include a second fastening means embodied in the thermoplastic that can be brought into reciprocal action with the fastening element, in particular that can be joined to the fastening element.

In the latter embodiment, it is preferred that the plastic compressor housing can be fastened to at least one bearing structure by means of the fastening element, wherein at least partial fastening of the thermoplastic and/or the plastic compressor housing to the bearing structure is assured, in particular with a reduction in the reciprocal action, in particular the bonding force, between the first fastening means and the fastening element. In this embodiment, the reduction in the bonding force results from a change in the (i) strength, including a change in structural strength, (ii) consistency and/or (iii) substance, of the thermosetting plastic body, in particular in the area of the first fastening means.

In another embodiment, the first fastening means includes at least a first opening and/or a first fixing device in the thermosetting plastic body and the second fastening means includes a second opening and/or a second fixing device, which is in particular aligned with the first opening in the thermoplastic. In particular, the fastening element can be inserted into the first opening and into the second opening, at least in regions, wherein in particular the first and/or the second opening and/or the first and/or the second fixing device includes or include at least one bore, at least one hole, at least one blind hole, and/or at least one thread. The fastening element of this embodiment comprises at least one rivet joint, screw connection, and/or clipped connection, wherein the thread can preferably be embodied by connecting the fastening element, in particular in the form of a self-cutting screw.

In another embodiment, the first anchoring element and/or the second anchoring element may include at least one depression, such as at least one undercut and/or at least one groove, at least one elevation, such as at least one bar, at least one surface area with an elevated surface roughness and/or at least one opening in the thermosetting plastic body. In this embodiment, the depression and/or the opening is substantially completely filled with the thermoplastic, the bar being substantially covered on all sides with the thermoplastic, and/or the surface area being substantially completely covered by the thermoplastic.

In another embodiment, the thermoplastic comprises at least a first stiffening device, in particular in the form of a first stiffening rib, and/or embodied in the thermosetting plastic body is at least a second stiffening device, in particular in the form of at least a second stiffening rib, preferably on at least one surface, in particular the first surface of the thermosetting plastic body and/or on at least one surface of the thermoplastic. In one embodiment, the first stiffening device is preferably formed by covering the second stiffening device with the thermoplastic.

Another embodiment further comprises at least a first stiffening device and/or at least a second stiffening device connected to at least a first compressor housing device and/or at least a second compressor housing device, wherein the first stiffening device and/or the second stiffening device is embodied between the first compressor housing device and the second compressor housing device, the first compressor housing device and/or the second compressor housing device including in particular the intake pipe, the compressor duct, the outlet pipe, the first anchoring element, the end edge of the thermosetting plastic body, the attachment area, the sealing lip, the first fastening means, the second fastening means, and/or the second anchoring element.

In some embodiments, the geometric dimension, in particular a width and/or a height, at least of a first stiffening device and/or at least of a second stiffening device is 0.2 mm to 5 mm, preferably 0.5 mm to 2.5 mm, more preferably 0.75 mm to 2 mm, and most preferably 0.8 mm to 1.2 mm. In other embodiments, at least two first stiffening devices, at least two second stiffening devices, and/or at least one first stiffening device and at least one second stiffening device are spaced approx. 3 to 20 mm from one another, preferably 5 mm to 15 mm, more preferably 7.5 to 12.5 mm, most preferably 9 mm to 11 mm.

In another embodiment, the plastic compressor housing comprises a plurality of first anchoring elements, second anchoring elements, first fastening means, second fastening means, fastening elements, first stiffening devices, and/or second stiffening devices.

Also disclosed herein is a method for producing a compressor housing, the basic body and the first anchoring element being produced in one piece, preferably in a spray process, in particular using an injection molding process.

In one embodiment of the method, the thermoplastic is sprayed on using an injection molding process.

In another embodiment, the method comprises joining the basic body to at least one fluid guide element prior to application, in particular prior to injection molding of the thermoplastic, and both the basic body, at least in regions, and the fluid guide element, at least in regions, are covered with the thermoplastic.

In another embodiment of the method, the thermoplastic is additionally clipped, at least in regions, to the basic body and/or the fluid guide element.

In certain embodiments, a highly ductile thermoplastic is used for the thermoplastic.

The method disclosed herein produces a two-component plastic compressor housing, in particular for a turbocharger.

A surprising understanding that thus underlies the present disclosure is that the structural strength of a plastic compressor housing, for example a turbocharger housing, can be increased in that a thermoplastic is applied to, in particular injection molded onto, a thermosetting plastic basic body of the plastic compressor housing, and the thermosetting plastic body includes at least a first anchoring element that is embodied in particular on a first surface of the thermosetting plastic body. The coating of the first anchoring element, which can be realized for instance by a free end of the thermosetting plastic or a bar embodied on a surface, a depression embodied on a surface, or a surface area with increased roughness, with the thermoplastic ensures that the thermoplastic component is securely held on the thermosetting plastic body. This increases the adhesion of the two components to one another. In particular, a plurality of first anchoring elements, for instance in the form of bars, can be formed in the area of a step for receiving a compressor housing rear wall, wherein the bars can be coated with thermoplastic. A gap that may otherwise occur between the thermosetting plastic body and the thermoplastic due to shrinkage in the injection molded thermoplastic is prevented from forming by the first anchoring elements. In addition, at extremely high loads, such as those that can occur for instance during a containment test, the thermoplastic component may be held securely to the thermosetting plastic basic body.

Moreover, aspects of the present disclosure are based on the surprising basic idea that the structural strength of the plastic compressor housing can be increased, in particular at extreme loads, in that the plastic compressor housing is fastened to a bearing structure via a fastening element such that the fastening element has reciprocal action with a first fastening means of the thermosetting plastic body and alternatively or additionally with a second fastening means of the thermoplastic. The fastening element can be provided in addition to the embodiment of the anchoring elements or independent of the use of anchoring elements. Thus the fastening element can comprise a screw, this being in particular a self-cutting screw. This screw is inserted into a first fastening means in the form of a bore in the thermosetting plastic body and joined to the thermosetting plastic by means of a thread present in the bore or by the thread cut by the screw.

In addition, a second fastening means is present in the thermoplastic, for instance in the form of a blind hole that is aligned with the first fastening means. The fastening element is furthermore joined to the thermoplastic by the second fastening means by further inserting the fastening element into the plastic compressor housing. The second fastening means can also be thermoplastic material that projects at least in part into the first fastening means, for instance a thermoplastic that is inserted into at least one recess or groove that is or are embodied in the first fastening means. Thus fastening, in particular screwing, the compressor housing to a bearing structure such as a turbocharger ensures that the fastening is attained by fixing the fastening element in both the thermosetting plastic and in the thermoplastic, in particular in that a thread of a screw cuts through the thermosetting plastic into the thermoplastic and is fixed there. The fixing of the fastening element, in particular the screw, in the thermoplastic ensures that the fastening element remains anchored in the thermoplastic at extreme loads and/or during anticipated destruction or bursting of the thermosetting plastic component and thus cannot separate from the compressor housing. This ensures that the compressor housing remains fixed on the bearing structure and simultaneously prevents the fastening element from separating from the compressor housing and possibly leading to additional damage and injuries.

In addition or alternative to the aforesaid aspects, the present disclosure is based on the surprising understanding that the structural strength of a plastic compressor housing can also be increased in that at least a first stiffening device, in particular in the form of a rib embodied on a thermoplastic surface, is embodied in the thermoplastic, and/or at least a second stiffening device, in particular in the form of stiffening rib, is embodied in the thermosetting plastic. At extremely high loads, such as can occur for instance during a containment test, comparatively strong tensile and/or bending forces occur, in particular in a radial direction of the plastic compressor housing. In order to minimize deformation and therefore the risk of the plastic compressor housing breaking, ribbing can be provided in the thermosetting plastic basic body, this attaining an increase in the stiffness of the thermosetting plastic basic body, in particular when the turbocharger is operating, but at the same time attaining stabilization of the plastic compressor housing when there are high loads.

In order to minimize deformation of the plastic compressor housing, in addition or alternative to the aforesaid aspects, the thermoplastic components can be stiffened using a U-profile and/or additional ribs for absorbing the aforesaid forces. In addition, no thermosetting plastic fragments from the interior of the compressor housing can escape to the outside. A plurality of stiffening elements may be attached to a flange-like extension of the thermoplastic cover in the area of a compressor housing rear wall. These ribs can extend to the region of the compressor duct via the thermoplastic cover. These ribs are preferably approximately 1 mm in width and spaced apart from one another by approximately 10 mm. In addition, ribs can be embodied in an area between the compressor duct and an intake pipe in order to increase axial and/or radial stiffness of the plastic compressor housing, the ribs preferably being embodied in the thermosetting plastic and being coated with thermoplastic. Depending on space considerations, stiffening elements can also be provided at other locations on the plastic compressor housing.

Finally, in addition or alternative to the aforesaid aspects, the present disclosure is based on the surprising understanding that the operational reliability of a turbocharger that includes the plastic compressor housing can be increased in that the structural strength of the turbocharger system is increased. A strength of a bond between the plastic compressor housing and a fluid guide element is increased in that, not only is the thermosetting plastic body of the plastic compressor housing covered by the thermoplastic, but the fluid guide element is also covered by the thermoplastic, at least in regions. As used herein, the term "covered" means the thermoplastic is at least contacted with another structure, such as the thermosetting plastic body or the fluid guide element. Thus the plastic compressor housing can advantageously be joined to a sound absorber, such as a charge air damper, in the region of the air outlet pipe.

For ensuring that the plastic compressor housing and the fluid guide element are joined to one another, the thermoplastic covering of the thermosetting plastic body extends beyond the thermosetting plastic body onto the fluid guide element. This creates a material bond between the plastic compressor housing and the fluid guide element in that both the basic body and the fluid guide element are provided with a thermoplastic hood formed by injection molding. Thus it can in particular be provided that the basic body is provided with the first anchoring element and/or the fluid guide element is provided with a second anchoring element, which ensures that the basic body and the fluid guide element are securely bonded to the thermoplastic. In particular, grooves can be provided into which the thermoplastic penetrates during coating. The fluid guide element can comprise a metal or a plastic so that the compatibility of the material for the fluid guide element and the thermosetting plastic body is not an issue.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
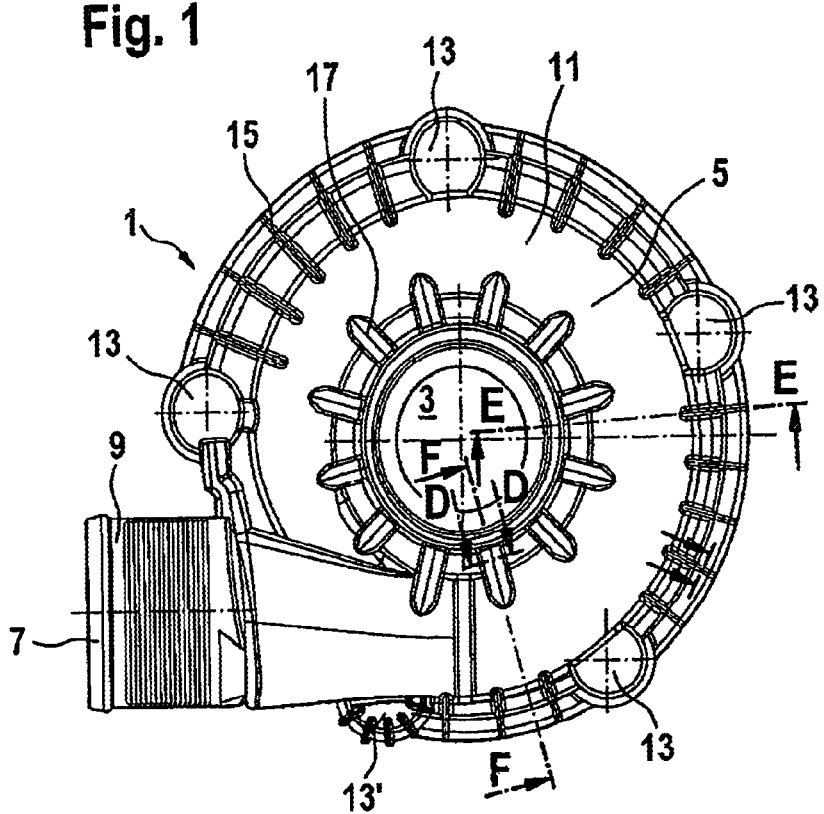
FIG. 1 is a top view of a plastic compressor housing formed in accordance with the present disclosure.

Additional features and advantages of the invention result from the following description in which an exemplary embodiment of the invention is explained as an example using schematic drawings. FIG. 1 depicts a plastic compressor housing 1 that is in particular a component of a turbocharger (not shown) for an internal combustion engine. The plastic compressor housing 1 forms an intake pipe 3 through which the air is pulled into the plastic compressor housing 1, compressed in a rotational compressor duct 5, and exits from the plastic compressor housing 1 via an outlet pipe 7. As shall be explained later, the plastic compressor housing 1 comprises a basic body 9 that substantially includes a thermosetting plastic, the basic body 9 being covered at least in regions by a thermoplastic hood 11. The thermoplastic hood 11 is preferably applied to the thermosetting plastic basic body 9 by means of an injection molding process. As can be seen from FIG. 1, the thermoplastic hood 11 substantially completely covers the top of the basic body 9, the plastic compressor housing 1 having a "blank" thermosetting plastic surface in the area of the outlet pipe 7. The plastic compressor housing 1 has fastening means 13, 13' for fastening the plastic compressor housing 1 to a bearing structure, in particular a turbocharger base. The structure and functioning of the fastening means is described in more detail later. The plastic compressor housing 1 furthermore has stiffening devices 15 and stiffening devices 17, the structure of which will be depicted in greater detail as follows.

Figure 2:
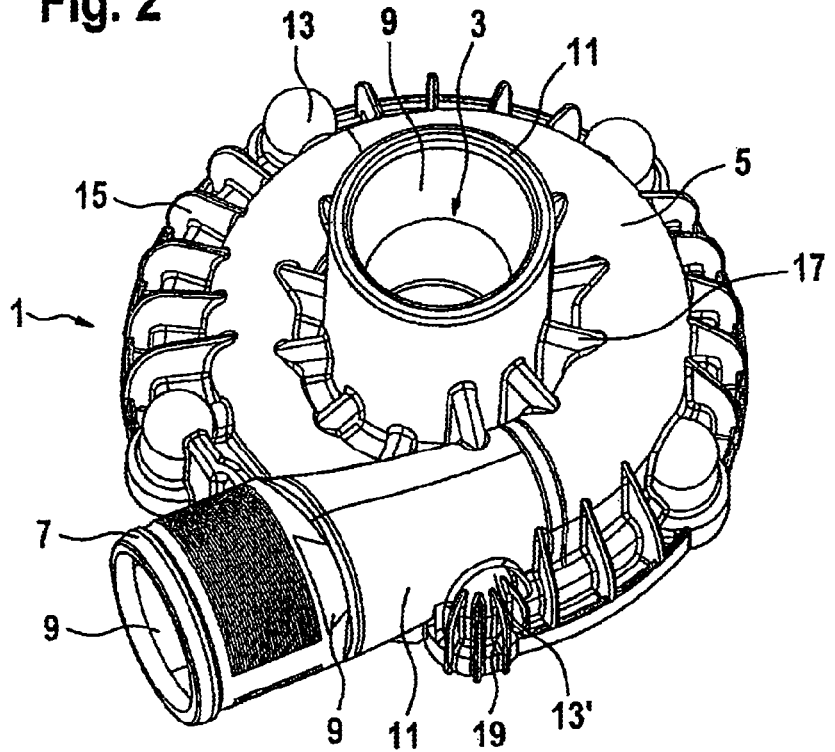
FIG. 2 is a perspective elevation of the plastic compressor housing in FIG. 1.

FIG. 2 depicts a perspective elevation of the plastic compressor housing. It can be seen in particular in FIG. 2 that the region of the intake pipe 3 of the basic body 9 made of thermosetting plastic is covered or coated with the thermoplastic hood 11. It can furthermore be seen from FIG. 2 that the stiffening devices 15, 17 are essentially embodied in the form of stiffening ribs and a fastening means 13' arranged in the area of the outlet pipe 7 has additional stiffening devices in the form of stiffening ribs 19.

Figure 3:
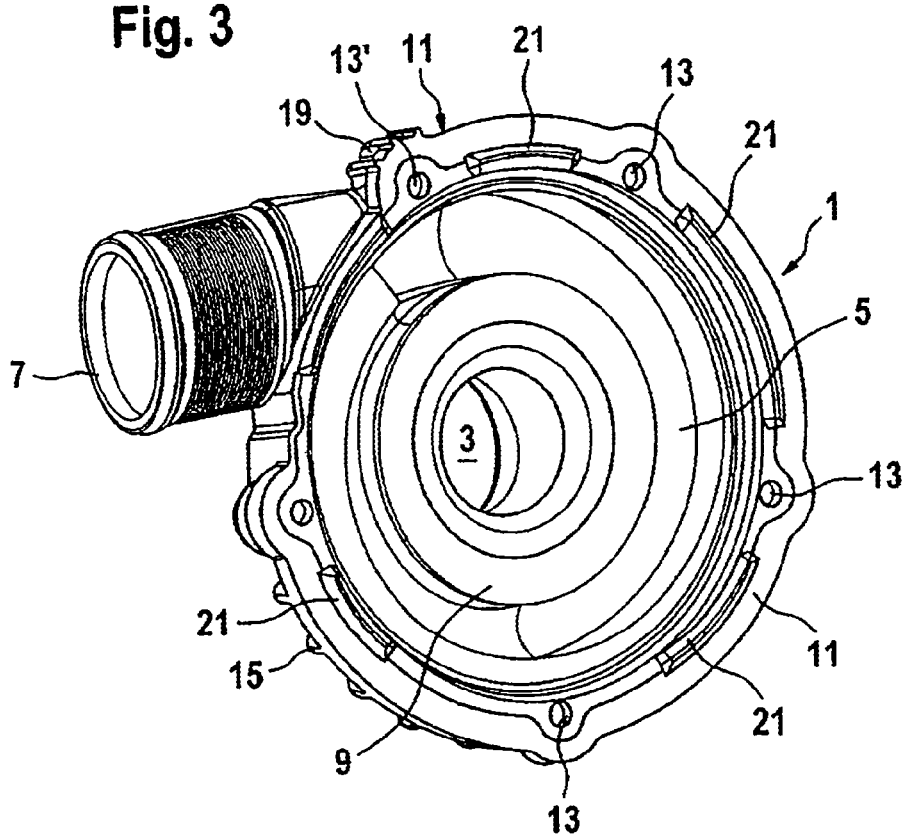
FIG. 3 is a perspective elevation from below of the plastic compressor housing in FIG. 1.

FIG. 3 is a perspective view from below the plastic compressor housing 1. It can be seen in particular how the thermoplastic hood 11 encloses the basic body 9 in a hood-like fashion. Also seen in FIG. 3 are first anchoring elements, in the form of bars 21, which are distributed around the circumference of a first surface of the basic body 9. These bars 21 are substantially completely enclosed by the thermoplastic material so that it is assured that the thermoplastic component is held securely on the basic body. There can be shrinkage effects in the thermoplastic, in particular after the thermoplastic material has been injection molded onto the basic body 9, so that gaps can occur between the basic body 9 and the thermoplastic hood 11. These are effectively prevented by the bars 21 that are embodied on the basic body 9 and the second surface of which is substantially completely covered by the thermoplastic material. Thus the thermoplastic material "clutches" the bars 21 so that shrinkage in the thermoplastic does not lead to the thermoplastic material shifting or separating, at least in regions, from the basic body 9. These anchoring elements in the form of bars 21 furthermore ensure that if the thermosetting basic body 9 is damaged, the structural strength of the plastic compressor housing 1 is not negatively affected because the thermoplastic hood 11 holds the plastic compressor housing 1 together and the secure bond between the basic body 9 and the thermoplastic hood 11 ensures that fragments of the basic body 9 cannot detach from the plastic compressor housing 1.

In embodiments of the plastic compressor housing 1 that are not depicted the anchoring elements can also be created using openings, undercuts, grooves, depressions, and/or surface roughness embodied in the basic body 9. When the thermoplastic material is added as a coating, these elements result in improved adhesion of the thermoplastic material to the basic body 9.

Figure 4:
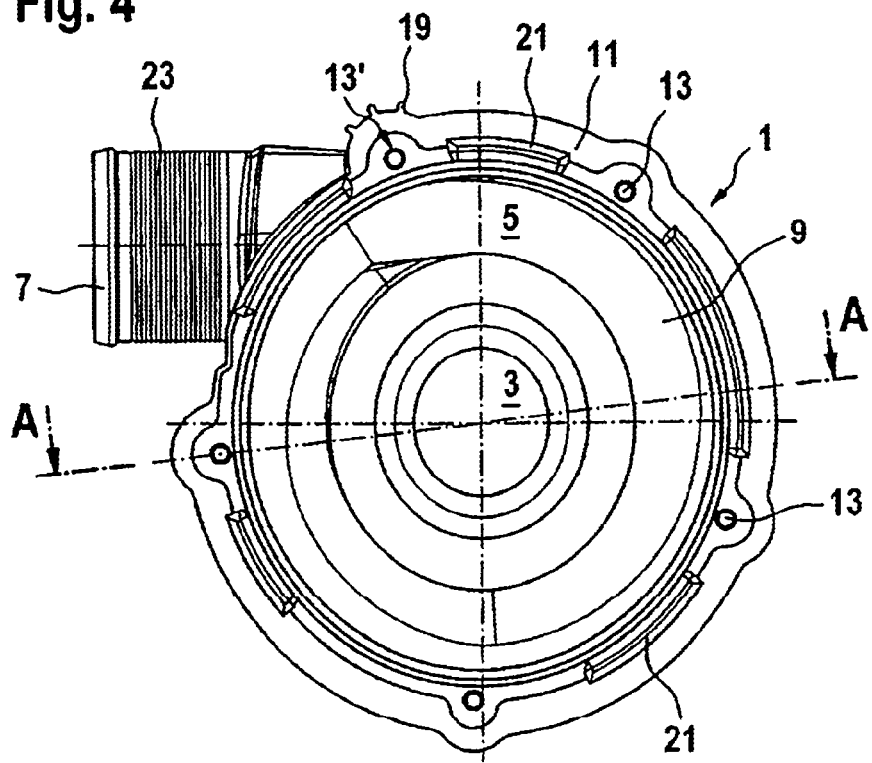
FIG. 4 is a view of the plastic compressor housing in FIG. 1 from below.

FIG. 4 is a view of the bottom of the plastic compressor housing 1. As can be seen from FIG. 4, on its surface the outlet pipe 7 has ribbing 23. This ribbing 23 ensures that a fluid tube pipe 7 that is placed over the outlet pipe 7 cannot slip off of the outlet pipe 7. Such a tube can in particular be fastened to the outlet pipe 7 using a pipe clamp (not shown). In one advantageous embodiment that can also be embodied independent of the use of anchoring elements, a fluid guide element such as a charge air damper for a turbocharger is fastened to the outlet pipe 7 such that the charge air damper is connected to the basic body 9 at the outlet pipe 7, in particular in that an inlet tube of the charge air damper is placed over the outlet pipe 7. Instead of an additional pipe clamp, the complete system, comprising the basic body 9 and the charge air damper, is coated with the thermoplastic for forming the thermoplastic hood 11. It is in particular provided that first anchoring elements are embodied in the region of the outlet pipe 7 and additional second anchoring elements are embodied on a second surface in the region of the charge air damper. The thermoplastic material extends at least in regions to the surface of the charge air damper. What this attains is that the charge air damper is securely fastened to the plastic compressor housing 1, in particular to the basic body 9, via the thermoplastic material. The first and second anchoring elements can be embodied in particular in the form of grooves into which the thermoplastic material enters when it is used for coating.

Figure 5:
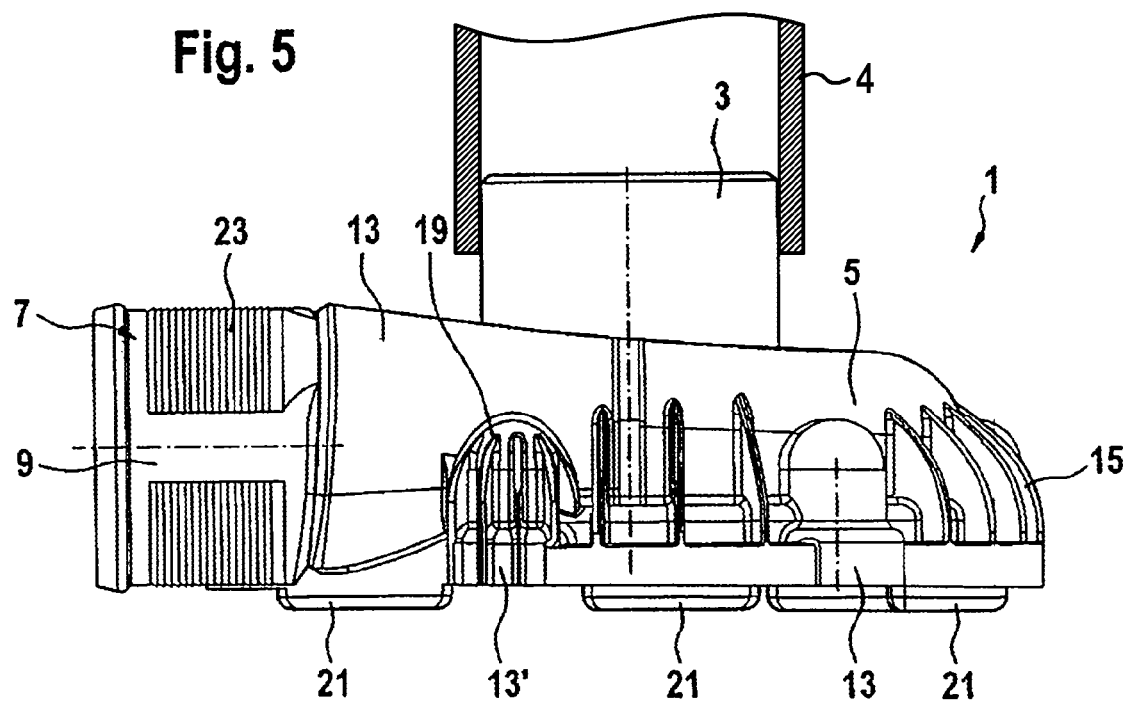
FIG. 5 is a side elevation of the plastic compressor housing in FIG. 1.

FIG. 5 is a side elevation of the plastic compressor housing 1. In particular the arrangement of the stiffening ribs 19 in the region of the fastening means 13' can be seen in FIG. 5. Also illustrated is a fluid guide element 4 connected to the intake pipe 3 through which air is pulled into the plastic compressor housing 1.

Figure 6:
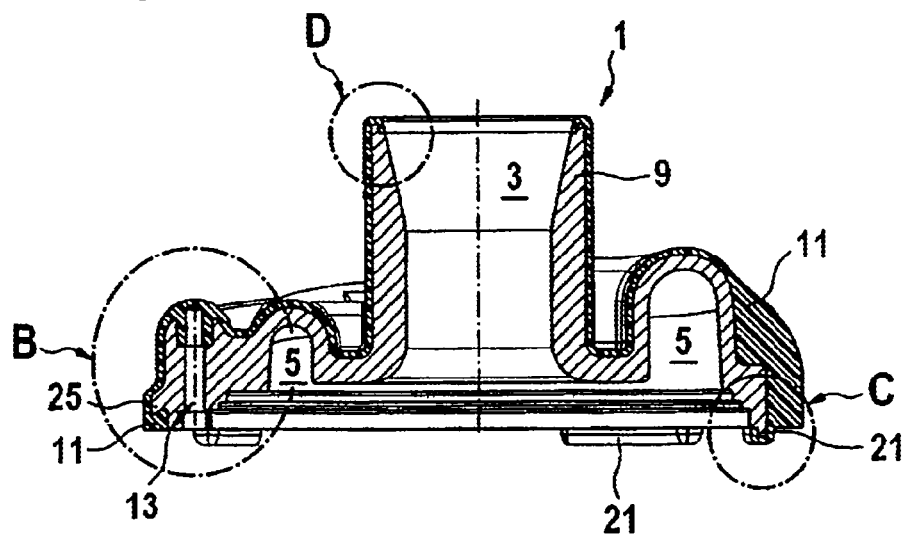
FIG. 6 is a sectional view along section line A-A in FIG. 4.

FIG. 6 is a sectional view of the plastic compressor housing 1 along section line A-A in FIG. 4. In particular it is possible to see from FIG. 6 how the thermoplastic hood 11 encloses or covers the thermosetting plastic basic body 9. It is furthermore possible to see in FIG. 6 first anchoring elements in the form of bars 21, but also an undercut 25.

Figure 7:
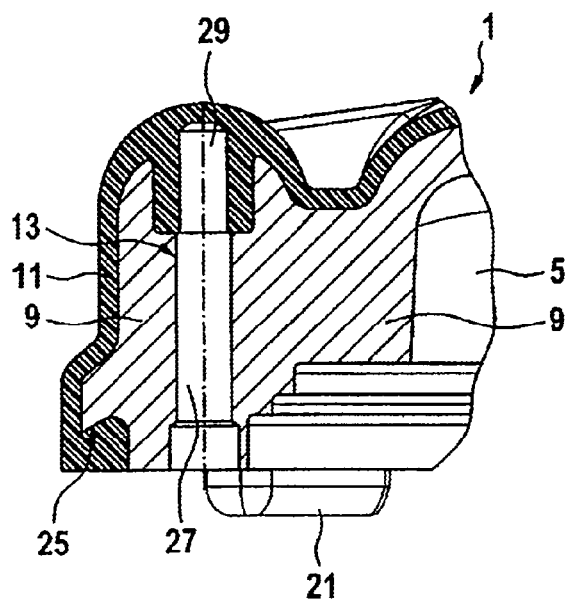
FIG. 7 is a detail view of section B in FIG. 6.
Figure 8:
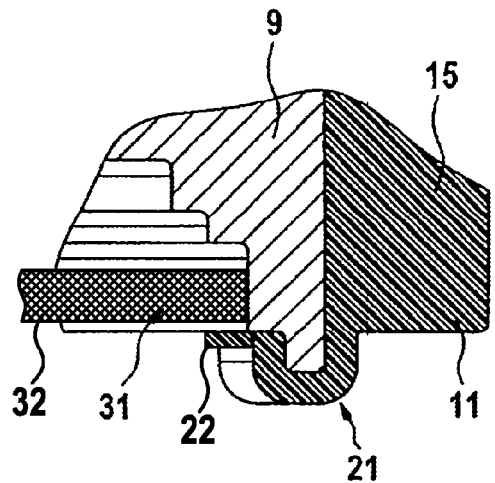
FIG. 8 is a detail view of section C in FIG. 6.
Figure 9:
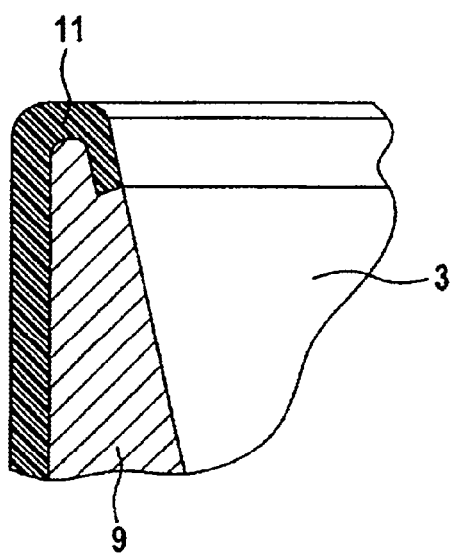
FIG. 9 is a detail view of section D in FIG. 6.

The fastening of the thermoplastic hood 11 to the thermosetting plastic basic body 9 shall now be explained using FIGS. 7 through 9, which depict detail views B through D from FIG. 6. As can be seen in FIG. 7, which is a detail view of section B in FIG. 6, the thermoplastic hood 11 covers the thermosetting plastic basic body 9. In order to prevent the thermoplastic hood 11 from separating from the thermosetting plastic basic body 9, in particular under extreme loads such as a containment test, on its surface the basic body 9 has an anchoring element in the form of an undercut 25. As can be seen in FIG. 7, the thermoplastic material covers the undercut 25 substantially completely. This anchors the thermoplastic hood to the thermosetting plastic basic body 9, and in particular prevents the thermoplastic hood 11 in FIG. 7 from being able to separate upward from the basic body 9.

In addition, the structure of the fastening means 13 can be seen in FIG. 7. The fastening means 13 includes a first fastening means in the form of a bore 27 embodied in the thermosetting plastic basic body 9. In addition, a second fastening means is embodied in the thermoplastic hood 11 in the form of a blind hole 29. A screw is screwed into the fastening means 13 for fastening the plastic compressor housing 1 to a bearing structure such as the base of a turbocharger. It can be provided that a thread is already embodied both in the bore 27 and in the blind hole 29, or alternatively a self-cutting screw can also be used that forms a corresponding thread in the bore 27 and in the blind hole 29. By screwing the compressor housing to the turbocharger, the screw is fixed both in the thermosetting plastic basic body 9 and in the thermoplastic hood 11. Fixing the fastening element in the form of the screw in the thermoplastics ensures that it remains fixed in the thermoplastic when there is a change in the strength of the thermosetting plastic basic body 9, for instance during a containment test, and thus the plastic compressor housing cannot separate from the turbocharger, and also prevents the screw from being able to separate from the compressor housing 1, which can lead to damage.

FIG. 8 depicts a detail view of section C in FIG. 6. It can be seen from FIG. 8 that the stiffening device 15 is substantially completely embodied in the thermoplastic body or thermoplastic hood 11. In addition, it is possible to see from FIG. 8 how the thermoplastic hood 11 substantially completely encloses the bar 21 that is embodied on the surface of the thermosetting plastic basic body 9. Thus the thermoplastic hood 11 is anchored to the thermosetting plastic basic body 9. In addition, it can be seen from FIG. 8 that the bar 21 is arranged in an attachment area 31 for a compressor housing element such as a compressor rear wall. In the attachment area 31, the thermosetting plastic basic body 9 has, in particular, a step-like contour form for attaching, at least in regions, an additional compressor housing element 32 in the form of a rear wall. A surface of the attachment area 31 and/or a surface adjacent to the attachment area 31 forms the first surface of the basic body 9. An extension of the thermoplastic hood 11 comprising a sealing lip 22 extends beyond the attachment area 31 of the thermosetting plastic body 9. In one embodiment form that is not depicted, the thermoplastic hood 11 can extend beyond the attachment area 31 in order to make it possible for the compressor rear wall to snap into an intermediate space. Finally, FIGS. 6 and 8 make it clear that the stiffening device 15 is arranged between a first compressor housing device in the form of the compressor duct 5 and a second compressor housing device in the form of the attachment area 31.

FIG. 9 depicts a detail view of section D from FIG. 6. From FIG. 9 it is possible to see how the thermoplastic in the form of the thermoplastic hood 11 encloses one end of the basic body 9 in the region of the intake pipe 3. This reinforces the fixation of the thermoplastic hood 11 to the thermosetting plastic basic body 9.

Figure 10:
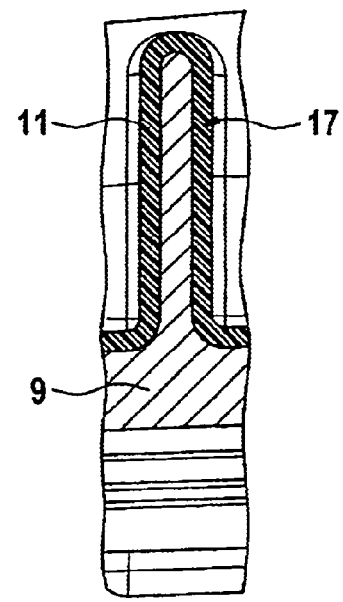
FIG. 10 is a sectional view of a stiffening element along section line D-D in FIG. 1.

FIG. 10 depicts a sectional view along the line D-D in FIG. 1. In FIG. 10 it is in particular possible to see the structure of the stiffening device 17 that is arranged between a first compressor housing device in the form of the intake pipe 3 and a second compressor housing device in the form of the compressor duct 5. As can be seen in FIG. 10, the stiffening device 17 embodied in the thermoplastic hood 11 is embodied in the form of a rib in that a rib is embodied in the basic body 9 and is coated with the thermoplastic material. Thus, in contrast to the stiffening device 15 depicted in FIG. 8, which is formed exclusively by the thermoplastic material, the stiffening device 17 is formed both by the thermosetting plastic material and the thermoplastic material.

Figure 11:
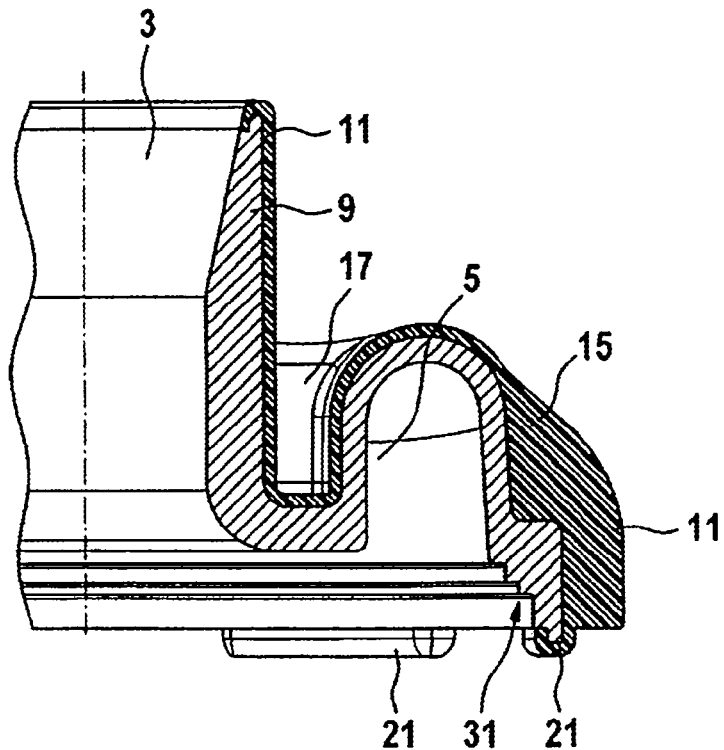
FIG. 11 is a sectional view along line E-E in FIG. 1.
Figure 12:
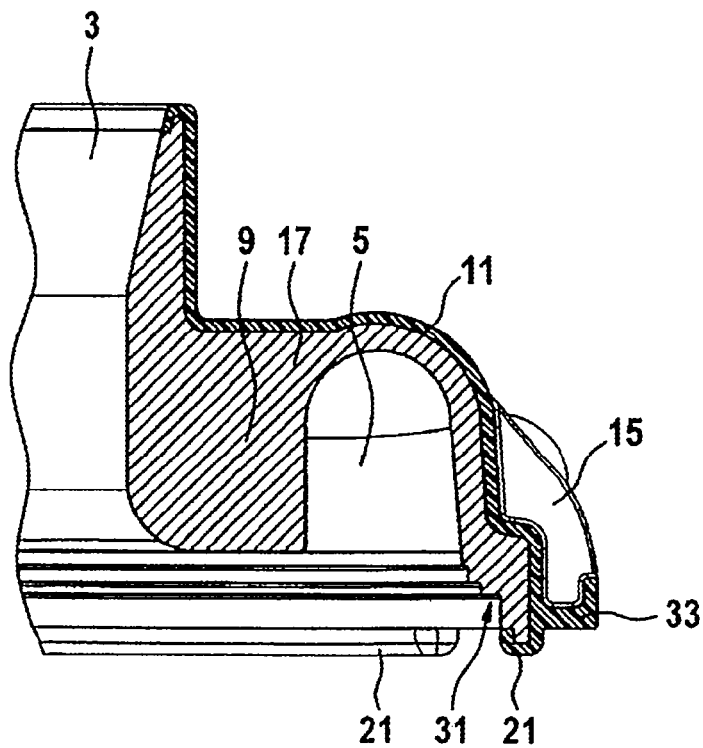
FIG. 12 is a sectional view along line F-F in FIG. 1.

FIG. 11 is a partial sectional view along line E-E in FIG. 1, while FIG. 12 is a partial sectional view along line F-F in FIG. 1. As can be seen by comparing FIGS. 11 and 12, the stiffening device 15 is substantially formed by the thermoplastic material, while the stiffening device 17 is substantially formed by the thermosetting plastic body 9 and by a coating of the thermoplastic hood 11. Given extreme loads, such as a containment test, forces that occur may cause the thermoplastic hood 11 to deform in a radial direction. In order to minimize such a deformation, which could negatively affect the functionality of a turbocharger, the thermoplastic component 11 is reinforced by a U-profile 33, as can be seen in FIG. 12.

In addition, the thermoplastic component is stiffened against corresponding loads that may occur by the stiffening device 15 in the form of additional ribs, in order in particular to ensure that if the basic body 9 is disturbed or breaks, no thermosetting plastic fragments can escape to the outside from the interior of the compressor housing. The stiffening device 17 is provided in order to increase the axial and/or radial stiffness in the plastic compressor housing 1 in the region between the compressor duct 5 and the air intake pipe 3. In this case, as well, coating with the thermoplastic material 11 prevents pieces of thermosetting plastic from escaping from the plastic compressor housing if the thermosetting plastic body 9 breaks.

In at least one embodiment, the stiffening devices 15 are in particular approximately 1 mm wide and are formed spaced apart from one another by approximately 10 mm.

The features of the invention disclosed in the foregoing specification, drawings, and claims can be implemented, both individually and also in any desired combination, for realizing the invention in its various embodiments.

The embodiments of the invention in which an exclusive property or privilege is claimed are defined as follows:

1. A plastic compressor housing, comprising:
    at least one thermosetting plastic body for providing an intake pipe, a compressor duct, and an outlet pipe;
    a thermoplastic at least partially covering said thermosetting plastic body in a hood-like fashion, said thermosetting plastic body being formed as a basic body and said thermoplastic being injection molded on said basic body,
    wherein at least a first surface of at least a first anchoring element is embodied on at least a first surface of said thermosetting plastic body, and wherein at least a second surface of said first anchoring element is substantially completely covered with said thermoplastic; and
    wherein at least one end edge of said thermosetting plastic body is covered, at least in regions, by said thermoplastic.

2. The plastic compressor housing of claim 1, wherein said thermosetting plastic body tapers toward the free end in the area of the end edge of said intake pipe and/or outlet pipe, and an extension of said thermoplastic wraps around the end edge.

3. The plastic compressor housing of claim 1, wherein said thermosetting plastic body is covered substantially completely by said thermoplastic at least in the area of said intake pipe and/or of said compressor duct.

4. The plastic compressor housing of claim 1, further comprising at least one fluid guide element connected to said intake pipe, compressor duct, and/or outlet pipe, wherein said fluid guide element is covered, at least in regions, by said thermoplastic, and wherein at least one second anchoring element is embodied on a surface of said fluid guide element, wherein said second anchoring element is covered, at least in regions, by said thermoplastic.

5. The plastic compressor housing of claim 4, wherein the fluid guide element is selected from a group consisting of a fluid filter element, a fluid pipe, and a damping element.

6. The plastic compressor housing of claim 4, wherein at least one anchoring element is embodied on at least a surface of the intake pipe, compressor duct, and/or outlet pipe that is covered, at least in regions, by said thermoplastic.

7. The plastic compressor housing of claim 4, wherein said fluid guide element comprises, at least in regions, a plastic and/or a metal.

8. The plastic compressor housing of claim 1, wherein said thermosetting plastic body comprises at least one attachment area having a step-like, contour form for attaching, at least in regions, at least one additional compressor housing element, wherein at least one surface of said attachment area and/or at least one surface adjacent to said attachment area form said first surface of the thermosetting plastic body.

9. The plastic compressor housing of claim 8, comprising an extension of said thermoplastic that extends beyond said attachment area of said thermosetting plastic body, further comprising at least one sealing lip, wherein the additional compressor housing element is attached between said attachment area of said thermosetting plastic body and said extension of said thermoplastic.

10. The plastic compressor housing of claim 1, comprising at least a first fastening means embodied in said thermosetting plastic body, wherein at least one fastening element is reciprocally connected to said first fastening means, and a second fastening means embodied in said thermoplastic, wherein the at least one fastening element is reciprocally joined to said second fastening means.

11. The plastic compressor housing of claim 10, wherein said plastic compressor housing is fastened to at least one bearing structure by means of said fastening element, wherein the thermoplastic and/or said plastic compressor housing remains fastened to said bearing structure with a reduction in the bonding force between said first fastening means and said fastening element, wherein the reduction in the bonding force results from a change in the strength, consistency and/or substance of said thermosetting plastic body, in the area of said first fastening means.

12. The plastic compressor housing of claim 10, wherein said first fastening means comprises at least a first opening and/or a first fixing device in said thermosetting plastic body and said second fastening means comprises a second opening and/or second fixing device in said thermoplastic, wherein said second opening is aligned with said first opening and said fastening element is inserted into said first opening and into said second opening, at least in regions.

13. The plastic compressor housing of claim 12, wherein said first and/or said second opening and/or said first and/or said second fixing device comprises at least one bore, at least one hole, at least one blind hole, and/or at least one thread, and wherein said fastening element comprises at least one rivet joint, screw connection, clipped connection, or a self-cutting screw.

14. The plastic compressor housing of claim 4, wherein said first anchoring element or said second anchoring element comprises:
   at least one depression, said depression comprising at least one undercut or at least one groove;
   at least one elevation, said elevation comprising at least one bar or at least one surface area with an elevated surface roughness; and/or
   at least one opening in said plastic compressor housing, wherein said depression or said opening are substantially completely filled with said thermoplastic, said bar is substantially contacted on all sides with thermoplastic, and said surface area is substantially completely covered by thermoplastic.

15. The plastic compressor housing of claim 1, further comprising at least a first stiffening device embodied in said thermoplastic and at least a second stiffening device embodied in said thermosetting plastic body.

16. The plastic compressor housing of claim 15, wherein said first stiffening device is formed by covering the second stiffening device with thermoplastic.

17. The plastic compressor housing of claim 15, wherein the first stiffening device and/or the second stiffening device are connected to at least a first compressor housing device and/or at least a second compressor housing device, wherein the first stiffening device and/or the second stiffening device is embodied between the first compressor housing device and the second compressor housing device, wherein the first and second compressor housing devices further comprise said intake pipe, said compressor duct, said outlet pipe, said first anchoring element, said end edge of said thermosetting plastic body, said attachment area, said sealing lip, said first fastening means, said second fastening means, and/or said second anchoring element.

18. The plastic compressor housing of claim 15, wherein a width and/or a height of the first stiffening device and/or the second stiffening device is in the range of 0.2 mm wide by 5 mm high, and wherein at least two first stiffening devices, at least two second stiffening devices, and/or at least one first stiffening device and at least one second stiffening device are spaced approximately 3 to 20 mm from one another.

19. The plastic compressor housing of claim 1, further comprising a plurality of first anchoring elements, second anchoring elements, first fastening means, second fastening means, fastening elements, first stiffening devices, and/or second stiffening devices.

20. A method for producing a plastic compressor housing in accordance with claim 1, comprising making said basic body and said first anchoring element in one piece using an injection molding process.

21. The method of claim 20, further comprising injecting said thermoplastic on the plastic compressor housing an injection molding process.

22. The method of claim 20, comprising joining said basic body to at least one fluid guide element prior to application of said thermoplastic, wherein both said basic body, at least in regions, and said fluid guide element, at least in regions, are covered with said thermoplastic.

23. The method of claim 22, further comprising clipping said thermoplastic, at least in regions, to said basic body and/or said fluid guide element.

24. The method of claim 21, wherein a two-component plastic compressor housing for a turbocharger is produced.

* * * * *

UNITED STATES PATENT AND TRADEMARK OFFICE
CERTIFICATE OF CORRECTION

| | | |
|---|---|---|
| PATENT NO. | : 8,342,800 B2 | |
| APPLICATION NO. | : 12/038779 | |
| DATED | : January 1, 2013 | |
| INVENTOR(S) | : Nenad Cvjeticanin | |

Page 1 of 1

It is certified that error appears in the above-identified patent and that said Letters Patent is hereby corrected as shown below:

In the Claims:

| COLUMN | LINE | ERROR |
|---|---|---|
| 12 (Claim 21) | 43 | "compressor housing an" should read --compressor housing using an-- |

Signed and Sealed this
First Day of October, 2013

Teresa Stanek Rea
*Deputy Director of the United States Patent and Trademark Office*